United States Patent [19]

Betts et al.

[11] 4,033,121
[45] July 5, 1977

[54] NOISE CONTROLLABLE NOZZLE CLOSURE

[75] Inventors: Robert E. Betts, Huntsville; Lawrence B. Thorn, Madison; Albert R. Maykut, Huntsville, all of Ala.

[73] Assignee: The United States of America as represented by the Secretary of the Army, Washington, D.C.

[22] Filed: Dec. 22, 1975

[21] Appl. No.: 643,411

Related U.S. Application Data

[62] Division of Ser. No. 484,035, June 28, 1974, Pat. No. 3,968,646.

[52] U.S. Cl. .......................... 60/271; 239/265.15; 102/49.3
[51] Int. Cl.² ...................... F02K 1/00; F02K 1/26
[58] Field of Search ..... 60/271; 39/265.15, 265.29, 39/265.43; 89/1.812; 102/49.8, 49.3

[56] References Cited

UNITED STATES PATENTS

| 3,121,310 | 2/1964 | Rice | 60/271 |
|---|---|---|---|
| 3,170,288 | 2/1965 | Penza et al. | 60/271 |
| 3,228,334 | 1/1966 | Oss | 239/265.15 |
| 3,910,191 | 10/1975 | Williams | 102/49.3 |

Primary Examiner—Carlton R. Croyle
Assistant Examiner—L. J. Casaregola
Attorney, Agent, or Firm—Nathan Edelberg; Robert P. Gibson; Harold W. Hilton

[57] ABSTRACT

A rocket motor nozzle closure for controlling the initial release of pressure from the rocket motor nozzle to reduce the occurrence of high pressure shock fronts which are detrimental to the weapon operator. The mass and geometry of the nozzle closure are predetermined to fit the desired motor performance. The release of motor pressure is controlled by the rate of change of momentum of the nozzle closure.

7 Claims, 7 Drawing Figures

NOISE CONTROLLABLE NOZZLE CLOSURE

This is a divisional application of patent application Ser. No. 484,035, now U.S. Pat. No. 3,968,646.

BACKGROUND OF THE INVENTION

Rocket motor ignition is normally controlled by utilizing an igniter which gives a controlled rate of heat release which simultaneously pressurizes the motor. Nozzle closures are used to aid ignition by retaining the igniter action until proper motor pressure is obtained. The nozzle closures normally used are metal or plastic and are retained in the nozzle by mechanical design or adhesives. When the desired pressure is reached, the closure is ruptured, sheared, extruded or overcomes the bond strength if adhesive is used. Such method of motor opening can generate an unacceptable noise level.

The present invention relates to nozzle closures which reduce and control the noise level generated by rocket motors during ignition by incrementally or continuously opening the motor.

Such closures are used to reduce the shock wave effect produced internally and externally to the motor. This is particularly advantageous for motors which operate near personnel.

SUMMARY OF THE INVENTION

A nozzle closure for rocket motors that incrementally or continuously opens the nozzle of the motor for controlling the initial release of pressure therefrom. The closure includes a forward portion extending into the motor and an aft portion extending rearwardly into the exit portion of the nozzle. The mass and geometry of both the forward and aft sections are predetermined to control the pressure release by rate of change of momentum of the closure during motor ignition.

DESCRIPTION OF THE PREFERRED EMBODIMENTS

Figure 1:
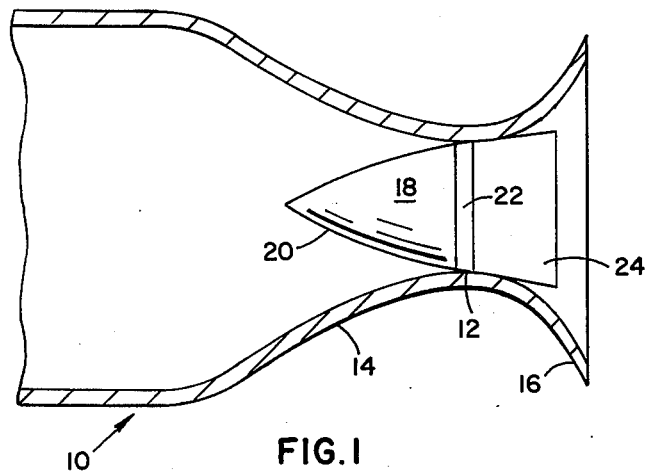
FIG. 1 is an elevational sectional view of an illustrative embodiment of the present invention.

As shown in FIG. 1, a rocket motor 10 includes a nozzle having a throat 12, an entrance section 14 and an exit section 16. A nozzle closure member 18 is mounted in the nozzle. A typical configuration includes a forward section 20 carried in the entrance section of the nozzle, a central section 22 which configurations range from contours and straight sections of zero to some given length, and an aft section 24.

Figure 2:
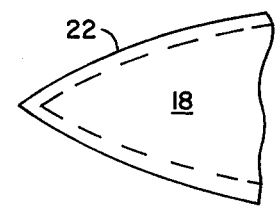
FIGS. 2 and 3 are elevational sectional views of various configurations of the forward sections of the nozzle closure.

As shown in FIG. 2, forward section 18 of the nozzle closure is provided with a curved surface 22 having an ogival configuration. The section is hollow to provide the closure member with less mass than the solid forward section as shown in FIG. 1. A closure member having less mass provides for less destructive debris in the blast. The curved configuration of the forward closure member of FIG. 2 provides a linear opening of the nozzle.

Figure 3:
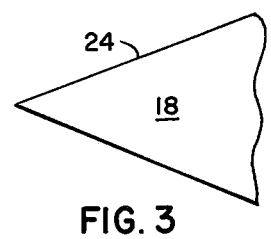

FIG. 3 illustrates a forward closure member having surface 24 having a conical configuration which provides for an exponential opening of the nozzle.

As seen in FIGS. 1-3 the forward portion of the closure tapers inwardly so that the largest diameter of the forward portion is provided with a diameter substantially equal to the internal diameter of the throat. The intermediate portion has a diameter substantially equalto the diameter of the throat.

FIGS. 4-7 illustrate various configurations of the aft portion 24 of the closure member. In these Figures it is seen that the aft portion is provided with various configurations which effect the mass and drag of the aft closure member.

Figure 4:
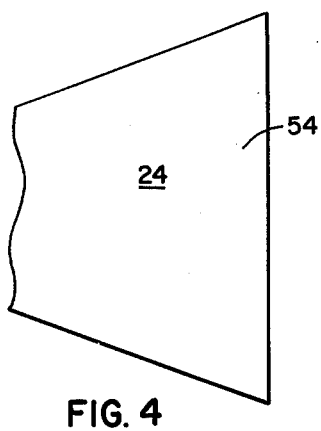
FIGS. 4-7 are elevational sectional views of various configurations of the aft sections of the nozzle closure.
Figure 6:
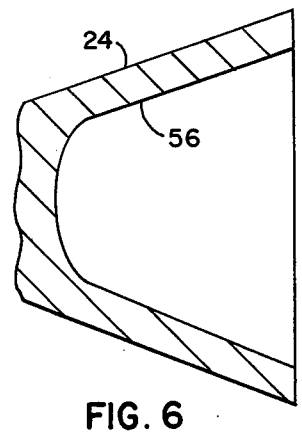
Figure 5:
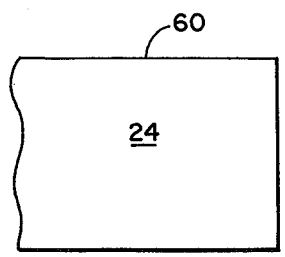
Figure 7:
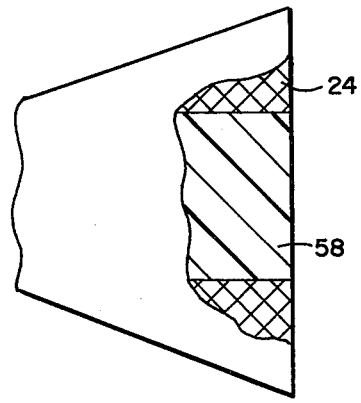

FIGS. 4, 6 and 7 discloses aft sections having substantially frusto conical configurations. After portion 24 (FIG. 4) illustrates a solid portion 54. FIG. 6 is provided with a hollowed out portion 56 to provide an aft section which will be of less mass than the solid aft section of FIG. 4. As seen in FIG. 7 a variable mass 58 is incorporated in the aft section. The weight and material of the variable mass is dependent upon the specific motor characteristics. The aft sectin of FIG. 5 is solid with a cylindrical surface 60.

It is to be understood that in the nozzle closures any of the aft sections shown can be combined with any of the forward sections shown. The choice depends on the motor characteristics, it only being required that the nozzle closures produce controlled opening in a predetermined manner. Since such opening is controllable by the overall density, configuration, and overall mass, low density closures can be used to give high motor pressure or vice versa.

I claim:

1. In a rocket motor having a nozzle including an entrance section, a throat section, and an exit section, closure means for controlling the opening of said nozzle responsive to ignition of said rocket motor comprising:
   a. a forward section disposed in said entrance section of said nozzle, said forward section having surfaces tapered inwardly away from said throat section, whereby the largest diameter of said forward section is provided with a diameter substantially equal to the internal diameter of said throat;
   b. an intermediate section disposed in said throat section; and,
   c. an aft section disposed in said exit section of said nozzle,
   d. said closure member having a predetermined density and mass for controlling the change of momentum of the closure member responsive to ejection thereof from said nozzle, whereby said nozzle opening is controlled incrementally or continuously.

2. A nozzle closure as set forth in claim 1 wherein said forward section is provided with a solid ogival configuration.

3. A nozzle closure as set forth in claim 1 wherein said forward section is provided with a hollow ogival configuration.

4. A nozzle closure as set forth in claim 1 wherein said forward section is provided with a conical solid configuration.

5. A nozzle closure as set forth in claim 1 wherein said aft section is provided with a solid fusto-conical configuration.

6. A nozzle closure as set forth in claim 1 wherein said aft section is provided with a frusto-conical configuration having a cut-out portion in the base thereof.

7. A nozzle closure as set forth in claim 1 wherein said aft section is provided with a frusto-conical configuration having a diverse material carried therein.

* * * * *